US012496831B2

(12) United States Patent
Kobayashi et al.

(10) Patent No.: US 12,496,831 B2
(45) Date of Patent: Dec. 16, 2025

(54) LIQUID DISCHARGE APPARATUS

(71) Applicants: Yuta Kobayashi, Tokyo (JP); Kenta Takahashi, Kanagawa (JP)

(72) Inventors: Yuta Kobayashi, Tokyo (JP); Kenta Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 18/483,170

(22) Filed: Oct. 9, 2023

(65) Prior Publication Data

US 2024/0140101 A1 May 2, 2024

(30) Foreign Application Priority Data

Oct. 28, 2022 (JP) ................................ 2022-173510

(51) Int. Cl.
*B41J 2/175* (2006.01)
*B01F 33/452* (2022.01)

(52) U.S. Cl.
CPC ......... *B41J 2/17513* (2013.01); *B01F 33/452* (2022.01); *B41J 2/17543* (2013.01)

(58) Field of Classification Search
CPC .... B41J 2/175; B41J 2/17503; B41J 2/17506; B41J 2/17509; B41J 2/17513; B41J 2/17516; B41J 2/17543; B01F 33/452
See application file for complete search history.

(56) References Cited

U.S. PATENT DOCUMENTS

| | | | | |
|---|---|---|---|---|
| 9,931,851 B1 * | 4/2018 | Marra, III | B08B 3/102 | |
| 2009/0189931 A1 * | 7/2009 | Noro | B41J 2/17596 | 347/7 |
| 2009/0251517 A1 * | 10/2009 | Matsumoto | B41J 2/17596 | 347/86 |
| 2010/0103233 A1 * | 4/2010 | Akatsuka | B41J 2/19 | 347/92 |
| 2012/0200649 A1 * | 8/2012 | Igawa | B41J 2/175 | 347/89 |
| 2020/0307235 A1 | 10/2020 | Chalamet et al. | | |
| 2022/0134764 A1 * | 5/2022 | Tokisawa | B41J 2/17503 | 347/85 |

FOREIGN PATENT DOCUMENTS

| | | |
|---|---|---|
| JP | H11-152197 A | 6/1999 |
| JP | 2002-200765 A | 7/2002 |
| JP | 2005-067094 A | 3/2005 |
| JP | 2011-067775 A | 4/2011 |
| JP | 2015-071263 A | 4/2015 |
| JP | 2020-146873 A | 9/2020 |
| WO | 2015/049918 A1 | 4/2015 |

OTHER PUBLICATIONS

Extended European Search Report dated Mar. 7, 2024 issued in corresponding European Appln. No. 23203740.8.

* cited by examiner

*Primary Examiner* — Anh T Vo
(74) *Attorney, Agent, or Firm* — Harness, Dickey & Pierce, P.L.C.

(57) ABSTRACT

A liquid discharge apparatus includes a liquid discharger, a liquid storage, a stirrer, a plate, and a magnetic force applicator. The liquid discharger discharges a liquid. The liquid storage stores the liquid. The stirrer is rotatable in a stirring region in the liquid storage to stir the liquid in the liquid storage. The stirrer has a magnetism. The plate is secured to the liquid storage to define the stirring region. The magnetic force applicator applies a magnetic force to the stirrer from an outside of the liquid storage to rotate the stirrer.

10 Claims, 9 Drawing Sheets

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-173510, filed on Oct. 28, 2022, in the Japan Patent Office, the entire disclosure of which is hereby incorporated by reference herein.

BACKGROUND

Technical Field

Embodiments of the present disclosure relate to a liquid discharge apparatus.

Related Art

A liquid discharge apparatus discharges a liquid from a nozzle onto a recording medium to apply the liquid to the recording medium to form, for example, characters and images.

SUMMARY

Embodiments of the present disclosure describe an improved liquid discharge apparatus that includes a liquid discharger, a liquid storage, a stirrer, a plate, and a magnetic force applicator. The liquid discharger discharges a liquid. The liquid storage stores the liquid. The stirrer is rotatable in a stirring region in the liquid storage to stir the liquid in the liquid storage. The stirrer has a magnetism. The plate is secured to the liquid storage to define the stirring region. The magnetic force applicator applies a magnetic force to the stirrer from an outside of the liquid storage to rotate the stirrer.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
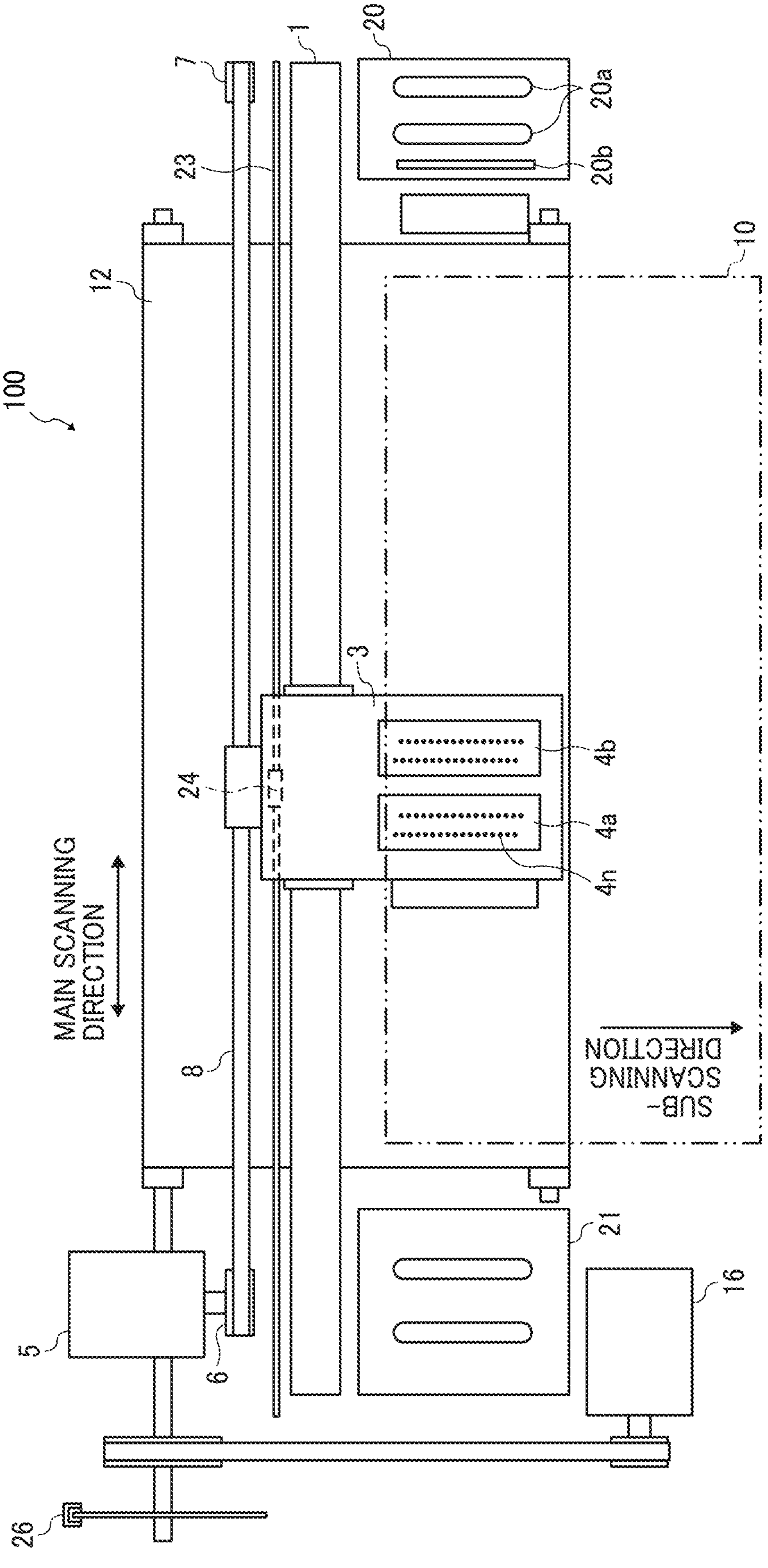
FIG. 1 is a schematic view of a liquid discharge apparatus according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus according to embodiments of the present disclosure is described below with reference to the drawings. The present disclosure is not limited to those embodiments, and any deletion, addition, modification, or change can be made without departing from the scope of the present disclosure in which a person skilled in the art can conceive other embodiments, any of which is included within the scope of the present disclosure as long as the effect and feature of the present disclosure are demonstrated.

A liquid discharge apparatus includes a liquid discharger, a liquid storage, a stirrer, a plate, and a magnetic force applicator. The liquid discharger discharges a liquid. The liquid storage stores the liquid. The stirrer has a magnetism to rotate to stir the liquid in the liquid storage. The plate is secured to the liquid storage to define the region in which the stirrer rotates. The magnetic force applicator applies a magnetic force to the stirrer from outside the liquid storage to rotate the stirrer.

According to one aspect of the present disclosure, the liquid discharge apparatus can be provided that smoothly rotates the stirrer in the liquid storage to prevent the rotating stirrer from contacting the liquid storage. As a result, the liquid can be stirred without damaging the liquid storage. Thus, the stirrer stirs the liquid in the liquid storage to prevent nonuniform concentration distribution of the liquid stored in the liquid storage.

The liquid discharger can be appropriately determined, and examples of the liquid discharger include a liquid discharge head. Examples of the liquid discharge head include an inkjet head. The liquid discharge head may be of a serial type or a line type (full-width type). The liquid discharger may include multiple liquid discharge heads. The liquid discharger may include a liquid discharge unit holding a plurality of liquid discharge heads. The liquid discharger discharges a liquid (e.g., ink) onto a medium.

In embodiments of the present disclosure, examples of the liquid discharge apparatus include an image forming apparatus, a printing apparatus, and a printer. The term "image forming apparatus" is an apparatus to form an image by discharging liquid onto a medium made of, for example, paper, thread, fiber, fabric, leather, metals, plastics, glass, wood, or ceramics. The term "image formation" indicates an action for providing (i.e., printing) not only meaningful images, such as characters and figures, on a medium but also meaningless images such as patterns on the medium (the term "image formation" includes causing liquid droplets to land on the medium).

In embodiments of the present disclosure, the term "medium" is not limited to a sheet of paper but represents a material onto which liquid droplets (ink droplets) or other kinds of liquid can adhere. For example, the medium may be an overhead projector (OHP) transparency, fabric, glass, or a substrate, and be used as a synonym of a recorded medium, a recording medium, a recording paper, or a recording sheet. The terms "image formation," "recording," "printing," and "image printing" are used herein as synonyms for one another.

The term "ink" is not limited to "ink" in a narrow sense, unless specified, but is used as a generic term for any type of liquid usable for image formation. For example, the term "ink" includes recording liquid, fixing solution, and liquid. The "ink" may be, e.g., deoxyribonucleic acid (DNA) sample, resist, pattern material, and resin.

The term "image" used herein is not limited to a two-dimensional image and includes, for example, an image applied to a three-dimensional object and a three-dimensional object itself formed as a three-dimensionally fabricated image.

An image forming apparatus 100 as a liquid discharge apparatus according to an embodiment of the present disclosure is described below.

FIG. 1 is a schematic plan view of a mechanism of the image forming apparatus 100. The image forming apparatus 100 is a serial-type inkjet recording apparatus. The image forming apparatus 100 according to the present embodiment includes a carriage 3, a main guide 1, and a sub-guide. The main guide 1 is bridged between left and right side plates, and the main guide 1 and the sub-guide moveably hold the carriage 3. The carriage 3 is reciprocally moved in a main scanning direction by a main scanning motor 5 via a timing belt 8 stretched between a drive pulley 6 and a driven pulley 7.

Recording heads 4*a* and 4*b* (may be referred to as a "recording head 4" unless distinguished) including a liquid discharge head are mounted on the carriage 3. The recording head 4 discharges liquid droplets (ink droplets) of colors of, for example, yellow (Y), cyan (C), magenta (M), and black (K). The recording head 4 is mounted on the carriage 3 such that nozzle rows Na and Nb (see FIG. 2) including multiple nozzles 4*n* arranged in a sub-scanning direction perpendicular to the main scanning direction. The recording head 4 discharges the liquid droplets downward from the multiple nozzles 4*n*.

Figure 2:
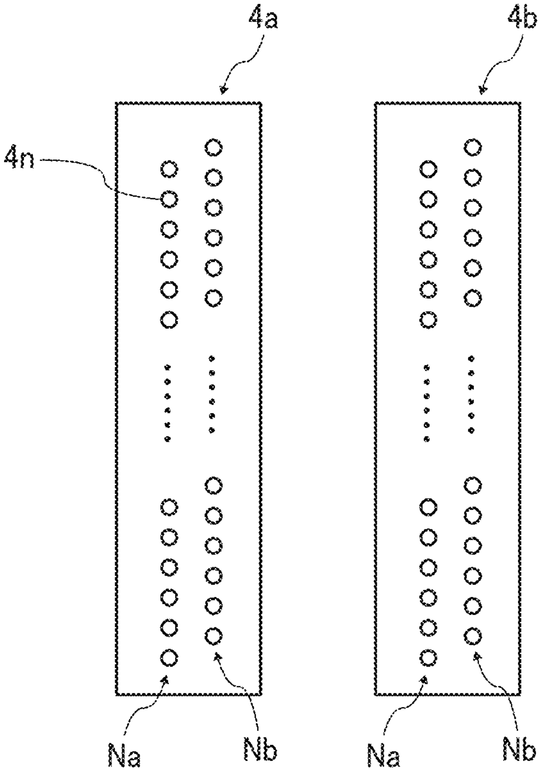
FIG. 2 is a schematic plan view of a liquid discharge head of the liquid discharge apparatus in FIG. 1.

FIG. 2 is a plan view of the recording head 4 as a liquid discharge head according to the present embodiment. For example, as illustrated in FIG. 2, each of the recording heads 4*a* and 4*b* includes the two nozzle rows Na and Nb in each of which the multiple nozzles 4*n* are arranged in a line. The nozzle row Na of the recording head 4*a* discharges liquid droplets of black (K), and the nozzle row Nb of the recording head 4*a* discharges liquid droplets of cyan (C). The nozzle row Na of the recording head 4*b* discharges liquid droplets of magenta (M), and the nozzle row Nb of the recording head 4*b* discharges liquid droplets of yellow (Y). For example, a piezoelectric actuator such as a piezoelectric element can be used as the liquid discharge head of the recording head 4.

On one end of the range of movement of the carriage 3 in the main scanning direction, a maintenance mechanism 20 that maintains and recovers the recording head 4 is disposed lateral to a conveyance belt 12. On the other end of the range of movement of the carriage 3 in the main scanning direction, a dummy discharge receptacle 21 that receives a dummy discharged liquid from the recording head 4 is disposed lateral to the conveyance belt 12.

The maintenance mechanism 20 includes, for example, a cap 20*a* and a wiper 20*b*. The cap 20*a* caps a nozzle face (a surface on which the nozzles 4*n* are formed) of the recording head 4. The wiper 20*b* wipes the nozzle face. Liquid droplets that do not contribute to image formation are discharged to the dummy discharge receptacle 21, or may be discharged to the cap 20*a* of the maintenance mechanism 20.

The image forming apparatus 100 further includes an encoder scale 23 and a main scanning encoder sensor 24. A predetermined pattern is formed on the encoder scale 23 in the main scanning direction of the carriage 3 between both the side plates. The main scanning encoder sensor 24 includes a transmissive photosensor attached to the carriage 3 to read the pattern of the encoder scale 23. The encoder scale 23 and the main scanning encoder sensor 24 construct a linear encoder (i.e., a main scanning encoder) that detects the movement of the carriage 3.

Figure 3:
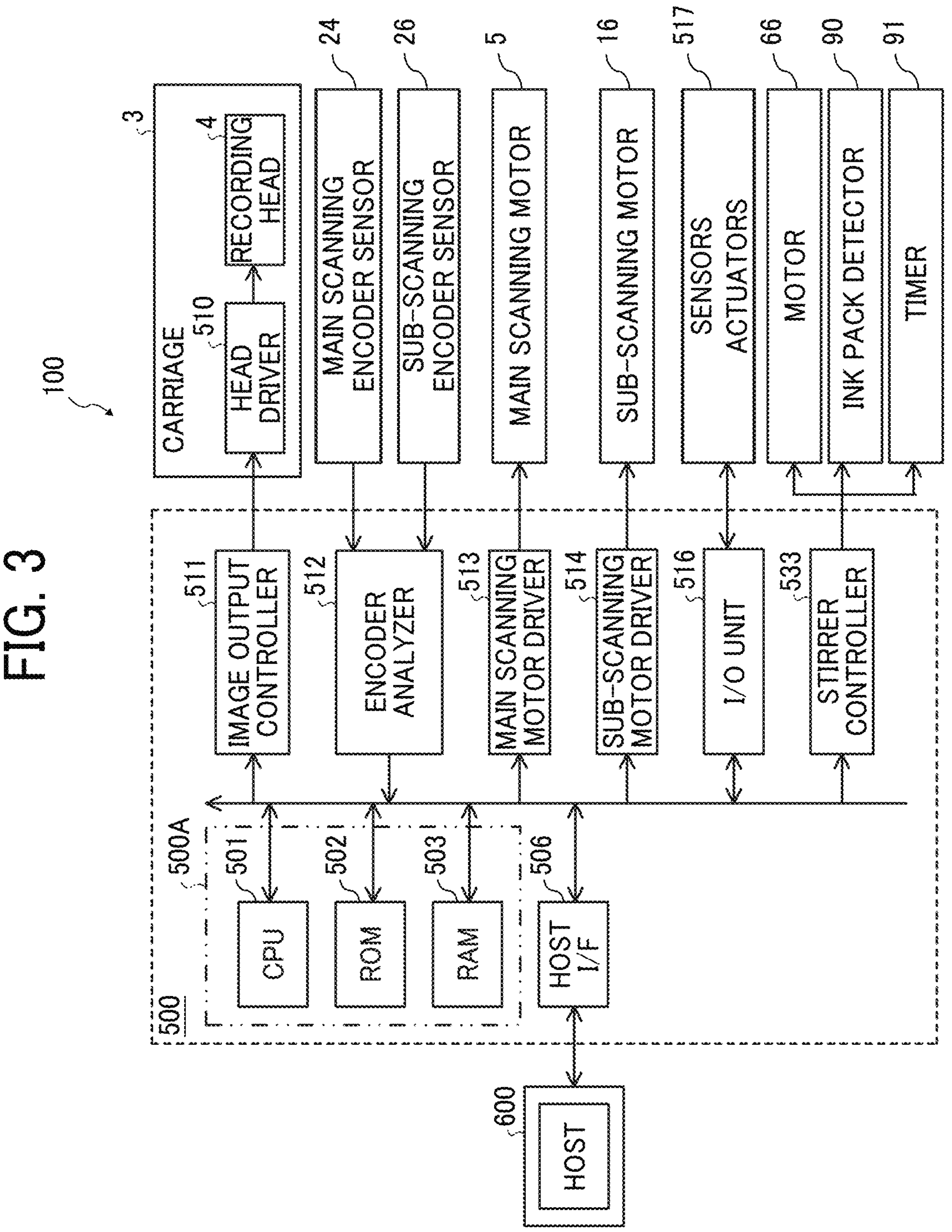
FIG. 3 is a functional block diagram of the liquid discharge apparatus in FIG. 1.

An outline of a controller 500 of the image forming apparatus 100 is described below. FIG. 3 is an overall block diagram of the image forming apparatus 100 including the controller 500 according to the present embodiment. The controller 500 as circuitry includes a main controller 500A including, for example, a central processing unit (CPU) 501, a read-only memory (ROM) 502, and a random access memory (RAM) 503. The CPU 501 controls the entire image forming apparatus 100. The ROM 502 stores programs that are executed by the CPU 501 and other fixed data. The RAM 503 temporarily stores image data and other data.

The controller 500 further includes a host interface (I/F) 506, an image output controller 511, and an encoder analyzer 512. The host OF 506 controls data transmission with a host (data processor) 600 such as a personal computer (PC). The image output controller 511 controls the driving of the recording head 4. The encoder analyzer 512 receives and analyzes detection signals from the main scanning encoder sensor 24 and a sub-scanning encoder sensor 26.

The controller 500 further includes, for example, a main scanning motor driver 513, a sub-scanning motor driver 514, and an input and output (I/O) unit 516. The main scanning motor driver 513 drives the main scanning motor 5. The sub-scanning motor driver 514 drives a sub-scanning motor 16. The I/O unit 516 controls input and output between the controller 500 and various sensors and actuators 517.

The image output controller 511 includes, for example, a data generation unit, a drive waveform generation unit, and a data transmission unit. The data generation unit generates print data. The drive waveform generation unit generates drive waveforms for controlling the driving of the recording head 4. The data transmission unit transmits a head control signal for selecting a desired drive signal from the drive waveforms and the print data.

The image output controller 511 outputs, for example, the drive waveform, the head control signal, and the print data to the head driver 510 to cause the recording head 4 to discharge liquid droplets from the nozzles 4*n* based on the print data. The head driver 510 is a head drive circuit for driving the recording head 4 mounted on the carriage 3.

A stirrer controller 533 controls the rotation of a stirrer to stir the liquid in a cartridge. For example, the stirrer controller 533 controls the driving of a motor 66, which is described later, to rotate a magnet that applies a magnetic force to the stirrer to rotate the stirrer. In addition, the stirrer controller 533 receives a detection result of a detector (e.g., an ink pack detector 90) that detects whether or not the cartridge is held by a cartridge holder, and controls the stirrer based on the detection result. Further, the stirrer controller 533 receives a measurement result from a measuring instrument or a time measurer (e.g., a timer 91) that measures a hold time during which the cartridge is held by the cartridge holder, and controls the stirrer based on the measurement result.

Caking is described below. The caking is likely to occur in ink containing pigment components (e.g., pigments 81 in FIG. 4) having a large specific gravity, such as white ink and silver ink. The pigment components with a large specific gravity are likely to precipitate in the ink.

Figure 4:
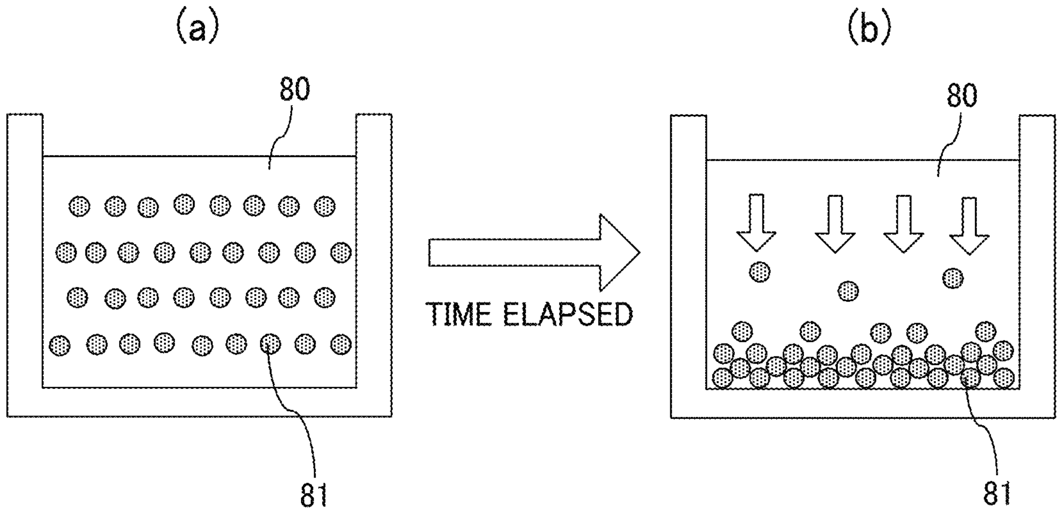
FIG. 4 is a schematic diagram illustrating the precipitation of a pigment.

FIG. 4 is a schematic diagram illustrating an example of the caking. A part (a) of FIG. 4 illustrates a state immediately after ink is stirred, and a part (b) of FIG. 4 illustrates a state in which the pigments 81 in the ink precipitate with time and the caking occurs. In FIG. 4, the ink includes a solvent 80 and the pigments 81.

In the industrial field, white ink is used as a foundation for printing on films or colored materials. For example, silver ink is used to impart glossiness. The white ink and the silver ink typically contain pigments (such as titanium oxide) which is likely to precipitate, and the precipitation of the pigments is more likely to occur than black (K) ink, cyan (C) ink, magenta (M) ink, and yellow (Y) ink.

As illustrated in the part (a) of FIG. 4, the pigments 81 having a large specific gravity in the ink are uniformly distributed in the ink immediately after the ink is stirred. Then, as illustrated in the part (b) of FIG. 4, the pigments 81 gradually precipitate with time. In the part (b) of FIG. 4, the pigments 81 precipitate as indicated by blank arrows. As the pigments 81 precipitate, the pigments 81 gradually settle down, accumulate, and solidify on the bottom of the cartridge as a container. Once the pigments 81 solidify, the pigments 81 are hardly dispersed again and do not return to the state illustrated in the part (a) of FIG. 4 even if the ink is stirred.

This phenomenon is generally referred to as caking. For example, the following countermeasures can be taken against the caking. In one countermeasure, a user periodically shakes the cartridge to stir the ink in the cartridge to prevent the precipitation of the pigment components. In another countermeasure, a maintenance operation is periodically performed to discharge the ink in the liquid discharge head to drain the settled pigment components together with the ink. In yet another countermeasure, the ink in the ink supply channel (e.g., downstream from the cartridge to the head tank or inside the head) is circulated to prevent the precipitation of the pigment components.

However, the operation of periodically shaking the cartridge imposes a heavy burden on the user, and if the user forgets to do such a task, the settled ink may be supplied. In addition, although the maintenance operation and the circulation mechanism for circulating the ink are effective for the caking, the configuration of the apparatus and the control of the apparatus become complicated.

In some techniques, a magnetic stirrer is inserted into an ink pack, and the stirrer is rotated by a magnetic force from the outside to stir the liquid (e.g., ink). However, in such techniques, when the magnetic force is not applied to the stirrer, the stirrer can freely move and float in the ink pack. If the stirrer is in a region where the magnetic force is not applied, the stirrer is not rotated and the liquid in the ink pack is not stirred.

In such techniques, the apparatus may grow complicated and large to control the movement of the stirrer. In addition, in such techniques, when the liquid in the ink pack decreases, the stirrer may contact the ink pack while rotating, and the ink pack may be damaged or broken.

On the other hand, a liquid discharge apparatus according to an embodiment of the present disclosure includes a liquid discharger, a liquid storage, a stirrer, a plate, and a magnetic force applicator. The liquid discharger discharges a liquid. The liquid storage stores the liquid. The stirrer has a magnetism to rotate to stir the liquid in the liquid storage. The plate is secured to the liquid storage to define the region in which the stirrer rotates. The magnetic force applicator applies a magnetic force to the stirrer from outside the liquid storage to rotate the stirrer.

In the present embodiment, the stirrer having the magnetism (i.e., the magnetic stirrer) is placed in the liquid storage, and the magnetic stirrer is rotated by the magnetic force from outside the liquid storage to stir the liquid in the liquid storage. The plate is secured to the liquid storage to define the region in which the stirrer rotates. Due to such a configuration, the stirrer is smoothly rotated in the liquid storage to prevent the rotating stirrer from contacting the liquid storage. As a result, the liquid can be stirred without damaging the liquid storage.

Since the plate is secured to the liquid storage, the magnetic force is reliably applied to the stirrer. As a result, the stirrer in the liquid storage can be reliably rotated. Even when the liquid in the liquid storage decreases, the stirrer can be prevented from contacting the liquid storage while rotating. The plate keeps the stirrer in a predetermined region (i.e., a stirring region) where the magnetic force is applied from the outside, and thus the stirrer in the liquid storage can be smoothly and reliably rotated. Accordingly, the nonuniform concentration distribution of the liquid in the liquid storage can be prevented.

Figure 5:
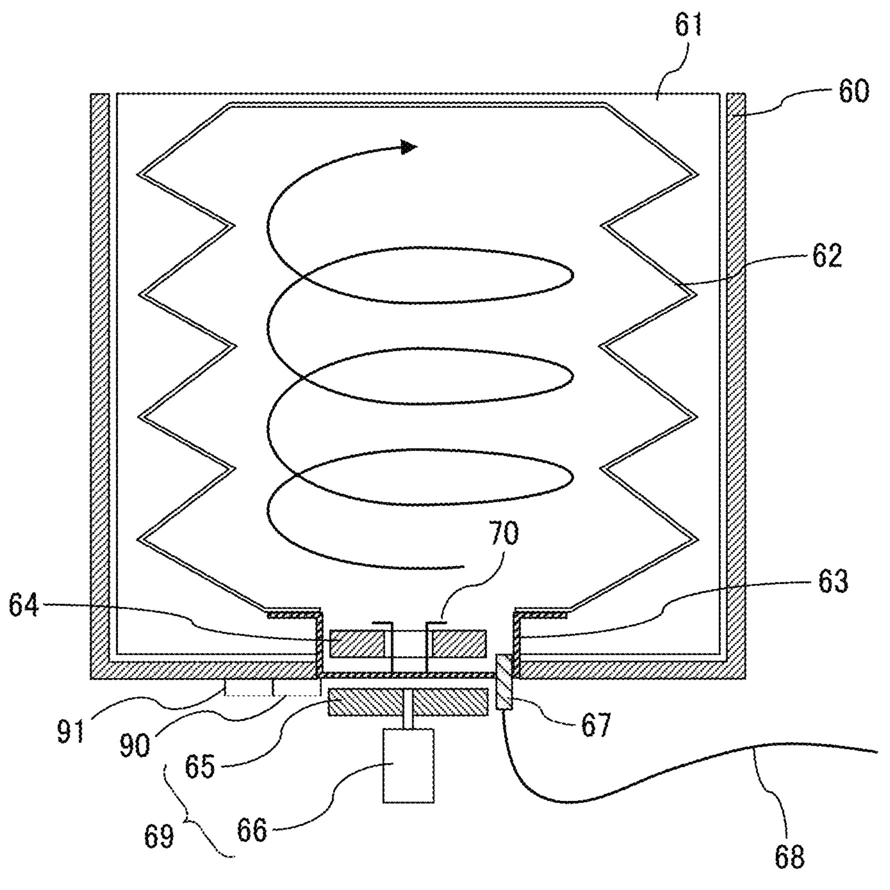
FIG. 5 is a schematic cross-sectional view of a liquid storage according to an embodiment of the present disclosure.

A liquid discharge apparatus according to the present embodiment is described below. FIG. 5 is a schematic view of a part of the liquid discharge apparatus according to the present embodiment. The liquid discharge apparatus according to the present embodiment includes, for example, an ink pack 62, a stirrer 64, a plate 63, a magnet 65, and a motor 66. The ink pack 62 is a liquid storage according to the present embodiment. The ink pack 62 stores a liquid (e.g., ink) and is made of a material having flexibility. The stirrer 64 has magnetism and is rotatable. The stirrer 64 rotates to stir the liquid in the ink pack 62. The plate 63 is secured to the ink pack 62 to define the region in which the stirrer 64 rotates.

A magnetic force applicator 69 according to the present embodiment applies a magnetic force to the stirrer 64 from outside the ink pack 62 to rotate the stirrer 64. The magnetic force applicator 69 according to the present embodiment includes, for example, a magnetism generator and a rotation driver. The magnetism generator generates magnetism to apply the magnetic force to the stirrer 64. The rotation driver rotates the magnetism generator. The magnet 65 is the magnetism generator according to the present embodiment and applies the magnetic force to the stirrer 64. The motor

66 is the rotation driver according to the present embodiment and rotates the magnet 65.

As the magnet 65 is rotated by driving the motor 66, the stirrer 64 is rotated. Thus, the liquid in the ink pack 62 can be stirred. The spiral arrow in FIG. 5 schematically indicates that the liquid in the ink pack 62 is stirred. The shape of the ink pack 62 is not limited to any particular shape. When the shape of the ink pack 62 has a longitudinal direction along the rotation axis of the stirrer 64, the stirrer 64 can generate a flow of the liquid in the longitudinal direction of the ink pack 62 (the vertical direction on the surface of the paper on which FIG. 5 is drawn). Accordingly, the liquid can be stirred efficiently.

Figure 6A:
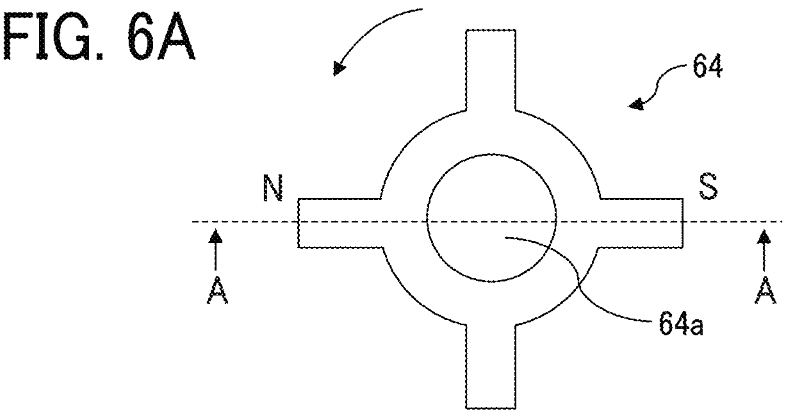
FIG. 6A is a schematic plan view of a stirrer according to an embodiment of the present disclosure.
Figure 6B:
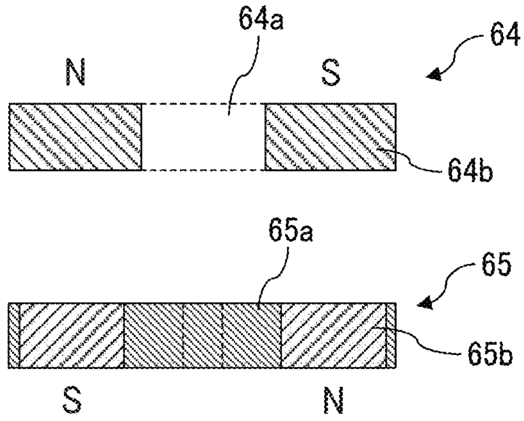
FIG. 6B is a schematic cross-sectional view of the stirrer taken along line A-A in FIG. 6A.
Figure 6C:
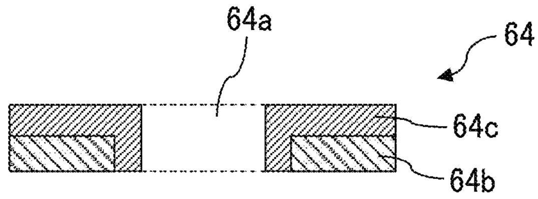
FIG. 6C is a schematic cross-sectional view of another stirrer taken along line A-A in FIG. 6A.

FIGS. 6A to 6C are schematic views of the stirrer 64 according to the present embodiment. FIG. 6A is a schematic plan view of the stirrer 64. The stirrer 64 has an opening 64*a*. For example, a part of a stopper 70 (see FIG. 5) is inserted through the opening 64*a*, and the stirrer 64 rotates with the opening 64*a* as the rotation axis. The arrow in FIG. 6A schematically indicates the rotation direction of the stirrer 64, and the rotation direction may be counter-clockwise as illustrated in FIG. 6A or may be clockwise.

In FIGS. 6A and 6B, a north (N) pole and a south (S) pole are schematically illustrated. The stirrer 64 according to the present embodiment has magnetism of the N pole and the S pole. Due to such magnetism, the stirrer 64 can be rotated by the rotation of the magnet 65. The arrangement of the N pole and the S pole is not limited to any particular arrangement and can be appropriately changed.

FIG. 6B is a schematic cross-sectional view of the stirrer 64 taken along line A-A in FIG. 6A. The magnet 65 which is the magnetism generator according to the present embodiment is also illustrated in FIG. 6B. Other components such as the plate 63 are omitted in FIG. 6B. The stirrer 64 according to the present embodiment may include a magnet 64*b*.

The N pole of the stirrer 64 and the S pole of a magnet 65*b* of the magnetism generator are attracted to each other, and the S pole of the stirrer 64 and the N pole of the magnet 65*b* of the magnetism generator are attracted to each other. Thus, as the magnet 65 of the magnetism generator is rotated by the motor 66, the stirrer 64 is rotated.

The magnet 65 includes, for example, the magnet 65*b* and a support 65*a* that supports the magnet 65*b*. The motor 66 rotates the support 65*a* to rotate the magnet 65*b*. The support 65*a* may have an opening and may include a component for receiving a driving force from the motor 66 in the opening. This opening is indicated by broken lines in FIG. 6B.

FIG. 6C is a schematic cross-sectional view of another stirrer 64, which is different from the stirrer 64 in FIG. 6B, taken along line A-A in FIG. 6A. In FIG. 6C, only the stirrer 64 is illustrated, and the magnet 65 is omitted. The stirrer 64 may include the magnet 64*b* as illustrated in FIG. 6B, or may include the magnet 64*b* and a support 64*c* that supports the magnet 64*b* as illustrated in FIG. 6C.

The shape of the stirrer 64 is not limited to any particular shape and can be appropriately determined. For example, the stirrer 64 may have four projections as illustrated in FIG. 6A. In this case, the N pole or the S pole is disposed each of the four projections to facilitate the rotation of the stirrer 64, and the projections serve as a blade to stir the liquid efficiently. The stirrer 64 according to the present embodiment may be referred to as, for example, the magnetic stirrer.

Preferably, the plate 63 restricts the movement (i.e., an axial movement) of the stirrer 64 in the direction (i.e., an axial direction) of the rotation axis of the stirrer 64 within the stirring region (e.g., a first predetermined range). The direction of the rotation axis of the stirrer 64 is, for example, the vertical direction on the surface of the paper on which FIG. 5 is drawn. The plate 63 restricts the movement of the stirrer 64 to prevent the stirrer 64 from moving in the direction of the rotation axis of the stirrer 64 to a region where the magnetic force does not reach. As a result, the failure that the stirrer 64 does not rotate can be prevented and the stirrer 64 is more reliably rotated.

When the plate 63 restricts the movement of the stirrer 64 as described above, for example, the stopper 70 may be used. The stopper 70 is a restrictor according to the present embodiment. The stopper 70 restricts the stirrer 64 from moving upward in the direction of the rotation axis, for example, in the direction toward the top on the surface of the paper on which FIG. 5 is drawn. The plate 63 restricts the stirrer 64 from moving downward in the direction of the rotation axis, for example, in the direction toward the bottom on the surface of the paper on which FIG. 5 is drawn. Due to such a configuration, the plate 63 can restrict the movement of the stirrer 64 in the direction of the rotation axis of the stirrer 64 within the predetermined region.

For example, the stopper 70 is secured to the plate 63 with a part of the stopper 70 inserted through the opening 64*a* of the stirrer 64. Thus, when the stirrer 64 is rotated, the plate 63 includes the stopper 70. In other words, the stopper 70 according to the present embodiment contacts an end of the rotation axis of the stirrer 64 to restrict the movement of the stirrer 64.

Since the part of the stopper 70 is inserted through the opening 64*a* of the stirrer 64 and another part of the stopper 70 is secured to the plate 63, the movement (i.e., a radial movement) of the stirrer 64 can be restricted also in the direction (i.e., a radial direction) perpendicular to the direction of the rotation axis of the stirrer 64. Accordingly, the stirrer 64 can be prevented from moving in the direction perpendicular to the direction of the rotation axis of the stirrer 64 to the region where the magnetic force does not reach. As a result, the failure that the stirrer 64 does not rotate can be prevented and the stirrer 64 is more reliably rotated. In other words, preferably, the plate 63 restricts the movement of the stirrer 64 in the direction perpendicular to the direction of the rotation axis of the stirrer 64 within the stirring region (i.e., a second predetermined range).

Figure 7A:
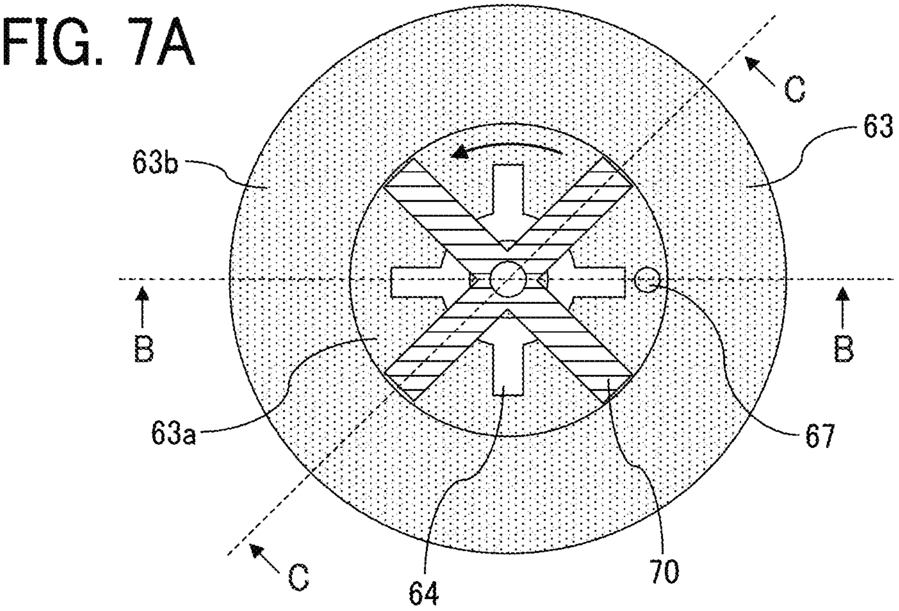
FIG. 7A is a schematic plan view of a stirrer according to another embodiment of the present disclosure.

FIG. 7A is a schematic plan view of the plate 63 as viewed from above, according to the present embodiment. The schematic cross-sectional view of the plate 63 and the stirrer 64 taken along line B-B in FIG. 7A corresponds to a part of the schematic cross-sectional view of FIG. 5. The plate 63 defines a region 63*a* in which the stirrer 64 rotates. The arrow in FIG. 7A schematically indicates the rotation direction of the stirrer 64, and the rotation direction may be opposite to the rotation direction illustrated in FIG. 7A. For example, the stopper 70 may have a shape as illustrated in FIGS. 7A and 7B.

Figure 7B:
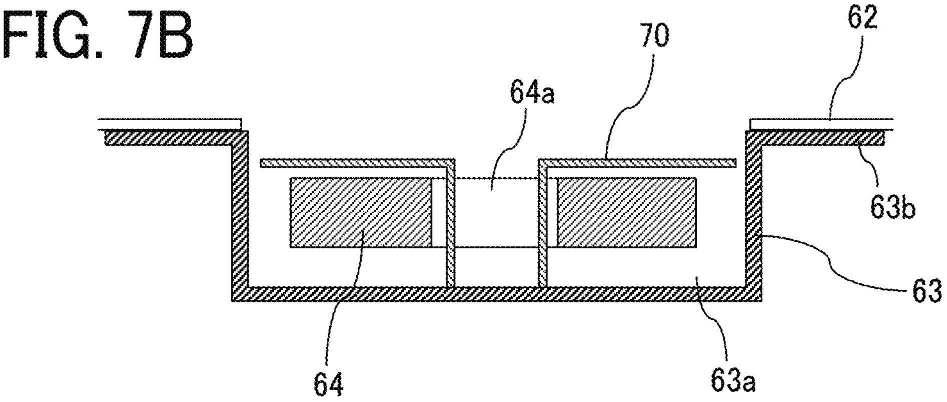
FIG. 7B is a schematic cross-sectional view of the stirrer taken along line C-C in FIG. 7A.

FIG. 7B is a schematic cross-sectional view of the plate 63 and the stirrer 64 taken along line C-C in FIG. 7A. The shape of the stopper 70 is not limited to any particular shape and can be appropriately determined. When the region 63*a* in which the stirrer 64 rotates is circular, as illustrated in FIGS. 7A and 7B, the stopper 70 according to the present embodiment has a portion having a length substantially equal to the diameter of the circle of the region 63*a*. In the present embodiment, the stopper 70 has two portions having a length substantially equal to the diameter of the circle of the region 63*a*. Such a configuration reliably prevents the stirrer 64 from moving upward.

A method for securing the plate 63 to the ink pack 62 can be appropriately determined. For example, as illustrated in FIGS. 7A and 7B, the plate 63 has a bonded portion 63*b*, and the corresponding portion of the ink pack 62 is press-bonded to the bonded portion 63*b*. In this method, airtightness of the ink pack 62 can be achieved, and liquid leakage (e.g., ink leakage) can be prevented. The plate 63 may be secured to the ink pack 62 with, for example, an adhesive.

The material of the plate 63 can be appropriately determined, and for example, resin is used as the material. The magnet 65 can apply the magnetic force to the stirrer 64 via the plate 63 made of resin. The plate 63 can be easily formed of resin in a desired shape. Resin having a hardness sufficient to define the region 63*a*, in which the stirrer 64 rotates, can be used as the material of the plate 63.

The position at which the plate 63 is secured to the ink pack 62 can be appropriately determined, but is preferably a lower portion of the ink pack 62 as illustrated in, for example, FIG. 5. Since the liquid (e.g., ink) flows toward the lower portion of the ink pack 62 (vertically downward direction) and stays in the lower portion, the stirrer 64 restricted by the plate 63, which is secured to the lower portion of the ink pack 62, can efficiently stir the liquid.

The magnetic force applicator 69 according to the present embodiment applies the magnetic force to the stirrer 64 via the plate 63. As illustrated in FIG. 5, the magnet 65 (the magnetism generator according to the present embodiment) applies the magnetic force to the stirrer 64 via the plate 63. Such a configuration prevents the magnetic force applicator 69 from contacting liquid (e.g., ink) in the ink pack 62, and the plate 63 defines a rotation space of the stirrer 64 (i.e., the region 63*a* in which the stirrer 64 rotates). As a result, the stirrer 64 can be smoothly rotated. In addition, such a configuration facilitates the design of, for example, a liquid supply port 67.

The liquid supply port 67 is illustrated in FIG. 5. The liquid supply port 67 is connected to a liquid supply path 68, and liquid (e.g., ink) is supplied from the ink pack 62 to the liquid discharge head (e.g., the recording head 4) through the liquid supply port 67 and the liquid supply path 68. The liquid supply port 67 is disposed, for example, in a lower portion of the plate 63 as illustrated in FIG. 5. More preferably, the plate 63 and the liquid supply port 67 are disposed in the lower portion of the ink pack 62. In this case, the liquid (e.g., ink) is reliably fed to the liquid supply port 67 even when the liquid in the ink pack 62 is low.

The position of the liquid supply port 67 can be appropriately determined. Preferably, the liquid supply port 67 is disposed in the region 63*a* defined by the plate 63 and at a position shifted from the rotation axis of the stirrer 64. Such a position of the liquid supply port 67 is illustrated in FIGS. 5 and 7A. The rotation axis of the stirrer 64 is, for example, the opening 64*a* of the stirrer 64 when the stirrer 64 is rotating.

Due to such a position of the liquid supply port 67, the liquid supply port 67 and the stirrer 64 are disposed close to each other. When the liquid (e.g., ink) in the ink pack 62 is low, the liquid is likely to remain in the vicinity of the liquid supply port 67. Accordingly, the stirrer 64 disposed in the vicinity of the liquid supply port 67 can stir the liquid even when the liquid in the ink pack 62 is low. Thus, the stirrer 64 can entirely stir the liquid.

The configuration of the liquid supply port 67 is not limited to any particular configuration and can be appropriately determined. For example, a resin component through which liquid can pass is coupled to the end of the liquid supply path 68. The resin component is inserted into an opening of the plate 63 to form the liquid supply port 67. For example, a component for forming the liquid supply port 67 is attached to an apparatus body of the liquid discharge apparatus, and when the ink pack 62 or a cartridge 61 is installed in the apparatus body, the component for forming the liquid supply port 67 is inserted into the plate 63. The liquid supply path 68 is not limited to any particular configuration, and examples of the liquid supply path 68 include a tube.

The ink pack 62 preferably has multiple folds, and when the amount of liquid in the ink pack 62 decreases, one or more of the multiple folds are preferably folded to reduce the volume of the ink pack 62. Thus, when the amount of ink in the ink pack 62 decreases, the ink pack 62 is folded in a compressed bellows shape. As a result, the ink can be stably supplied, and the ink in the ink pack 62 can be fully used up.

Figure 8:
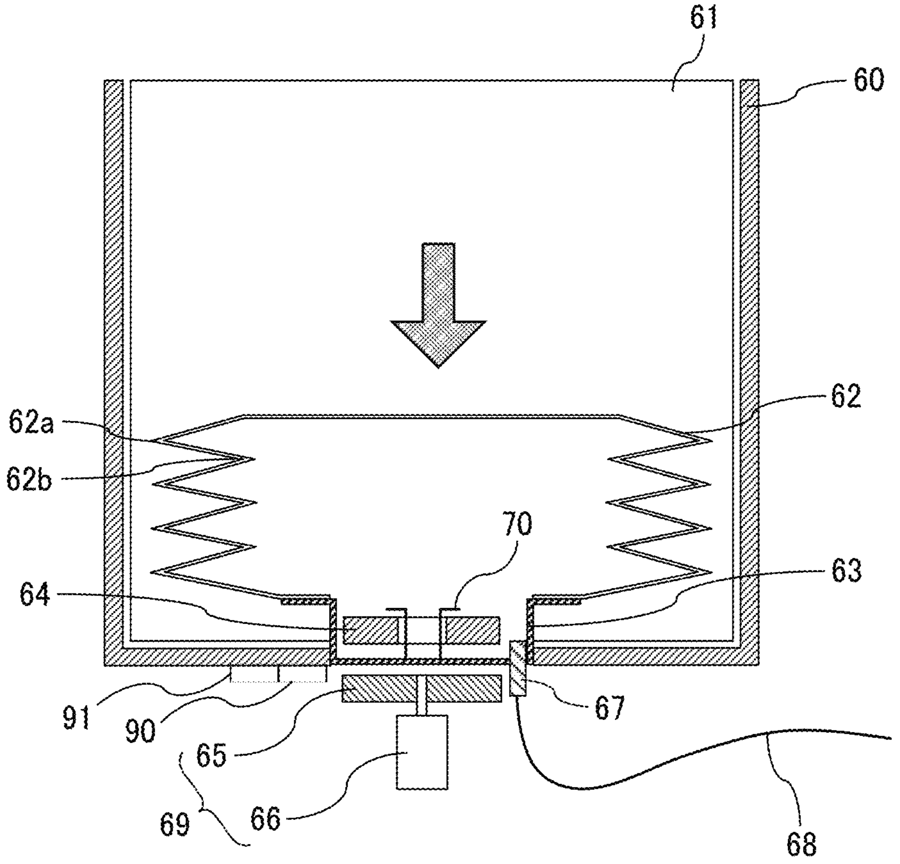
FIG. 8 is a schematic cross-sectional view of the liquid storage illustrated in FIG. 5 when the liquid in the liquid storage is low.

FIG. 8 is a schematic cross-sectional view of the ink storage when the amount of ink decreases in the above embodiment illustrated in FIG. 5. The black fat arrow in FIG. 8 schematically indicates a direction in which the ink pack 62 is compressed. The ink pack 62 in FIG. 8 has the multiple folds including a mountain fold 62*a* and a valley fold 62*b* which are foldable.

As illustrated in FIG. 8, even when the amount of ink in the ink pack 62 decreases, the plate 63 can keep the region 63*a* in which the stirrer 64 rotates to minimize the amount of ink remaining in the ink pack 62. According to the present embodiment, even when the amount of ink decreases and the shape of the ink pack 62 changes, the rotating stirrer 64 is prevented from contacting the ink pack 62. As described above, the plate 63 and the liquid supply port 67 disposed at the lower portion of the ink pack 62 can minimize the amount of ink remaining in the ink pack 62.

The shape of the plate 63 may be appropriately determined as long as the plate 63 has the region 63*a* in which the stirrer 64 rotates. As illustrated in FIGS. 5 and 8, the cross-sectional shape of the plate 63 is preferably a recessed shape, and the stirrer 64 preferably moves within the depth of the recess of the plate 63 when the stirrer 64 rotates. In this case, even if an upper portion of the ink pack 62 contacts the plate 63 when the ink pack 62 is gradually compressed as illustrated in FIG. 8, the stirrer 64 is prevented from contacting the ink pack 62 and can be rotated.

In the liquid discharge apparatus according to the present embodiment, the stirrer 64 is preferably controlled to be rotated when the ink pack 62 is installed in the apparatus body. Such a control prevents the stirrer 64 from being rotated when the ink pack 62 is not installed in the apparatus body. For such a control, the liquid discharge apparatus includes, for example, the detector to detect whether the ink pack 62 is installed in the apparatus body. The detector prevents a supply operation of the liquid discharge apparatus when the ink pack 62 is not installed in the apparatus body. For example, a supply module is not driven when the ink pack 62 is not installed. The detector according to the present embodiment is described below.

The liquid discharge apparatus according to the present embodiment includes the controller 500 that controls the magnet 65 (i.e., the magnetism generator), a cartridge holder 60 (i.e., a holder) that holds the ink pack 62 (i.e., the liquid storage), and the ink pack detector 90 (i.e., the detector) that detects the ink pack 62 held in the cartridge holder 60. When the ink pack detector 90 detects that the ink pack 62 is held in the cartridge holder 60, the controller 500 controls the magnet 65 to be driven. Such a control prevents the stirrer 64 from being rotated when the ink pack 62 is not installed in the cartridge holder 60.

The detector is not limited to any particular device and can be appropriately determined. A method of detecting the ink pack 62 held in the cartridge holder 60 by the detector is not limited to any particular method and can be appropriately determined. For example, the ink pack 62 includes an identification (ID) chip, and the detector reads information from the ID chip to detect the ink pack 62.

Although the installation of the ink pack 62 is not limited to any particular configuration, the cartridge 61 is replaceable in the present embodiment. The cartridge 61 accommodates the ink pack 62 and the plate 63 in a housing thereof. When the cartridge 61 is installed in the cartridge holder 60, liquid (e.g., ink) can be supplied from the ink pack 62. In other words, the ink pack 62 is detachably attachable to the cartridge holder 60. The terms "the ink pack 62 is held by the cartridge holder 60" include a case in which the cartridge 61 is installed in the cartridge holder 60.

In the liquid discharge apparatus according to the present embodiment, the stirrer 64 may be controlled to be rotated based on the time during which the ink pack 62 is installed in the apparatus body (i.e., held in the cartridge holder 60). As described with reference to FIG. 4, the caking may occur in the liquid, for example, in ink containing a pigment. For this reason, the liquid in the ink pack 62 is preferably stirred when a predetermined time has elapsed since the ink pack 62 is installed. The measuring instrument according to the present embodiment is described below.

The liquid discharge apparatus according to the present embodiment includes the timer 91 (i.e., the measuring instrument) in addition to the controller 500, the cartridge holder 60, and the ink pack detector 90 described in the above embodiment. The timer 91 measures the time during which the ink pack 62 is held by the cartridge holder 60. The controller 500 according to the present embodiment drives the magnet 65 to rotate the stirrer 64 at a predetermined timing based on measurement results of the timer 91. Due to such a configuration, the caking can be further prevented. Such a configuration can reduce the necessity of manual stirring.

In the present embodiment, the predetermined timing can be appropriately determined. For example, the predetermined timing is when a predetermined time has elapsed after the ink pack 62 is held (may be referred to as mounted, installed, or attached) in the cartridge holder 60. In this case, the predetermined timing may be one time or multiple times. For example, the liquid in the ink pack 92 may be stirred each time the predetermined time elapses after the ink pack 62 is held in the cartridge holder 60. In addition, the time during which the ink pack 62 is held in the cartridge holder 60 and the time elapsed since the liquid is previously stirred may be considered together.

Another embodiment of the present disclosure is described below with reference to FIGS. 9 and FIGS. 10A and 10B. The present embodiment is different from the above-described embodiment in, for example, the configuration of the liquid supply port. In the present embodiment, the liquid supply port is disposed on the rotation axis of the stirrer 64. As a result, the volume of the plate 63 can be limited to only the region in which the stirrer 64 rotates, and the plate 63 can be made smaller. Accordingly, the amount of liquid (e.g., ink) remaining in the plate 63 can be reduced to reduce the residue of the liquid. In the liquid discharge apparatus according to the present embodiment, the liquid supply port is disposed in the plate 63. Specifically, the liquid supply port is disposed on the rotation axis of the stirrer 64 when the stirrer 64 is viewed from above in plan view.

Figure 9:
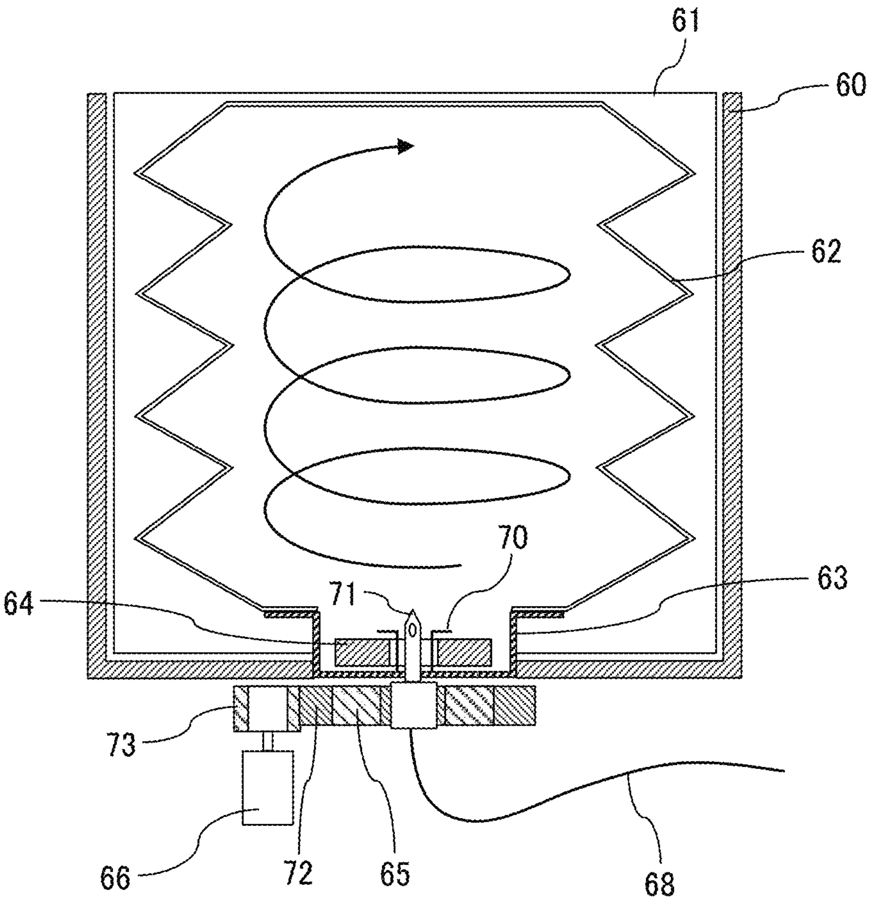
FIG. 9 is a schematic cross-sectional view of a liquid storage according to another embodiment of the present disclosure.

FIG. 9 is a schematic cross-sectional view of the liquid storage according to the present embodiment. FIG. 10A is an enlarged view of a part of the liquid storage illustrated in FIG. 9, and FIG. 10B is a schematic plan view of the stirrer viewed from above, according to the present embodiment. FIG. 9 and FIG. 10A are schematic cross-sectional views of the liquid storage taken along line D-D in FIG. 10B.

Figure 10A:
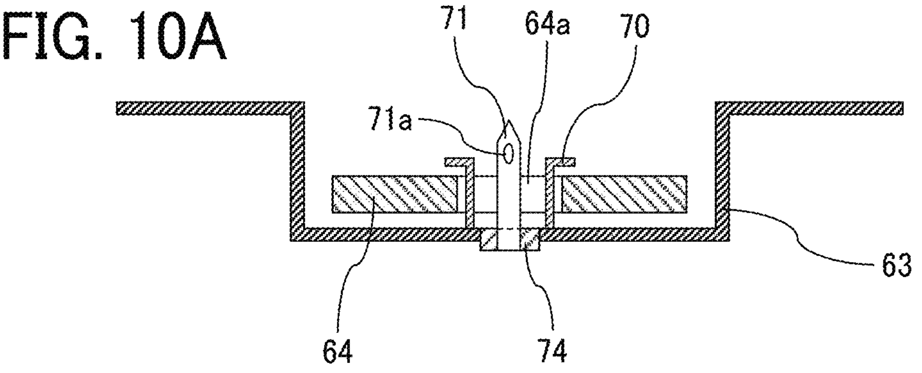
FIG. 10A is a schematic cross-sectional view of a part of the liquid storage illustrated in FIG. 9.
Figure 10B:
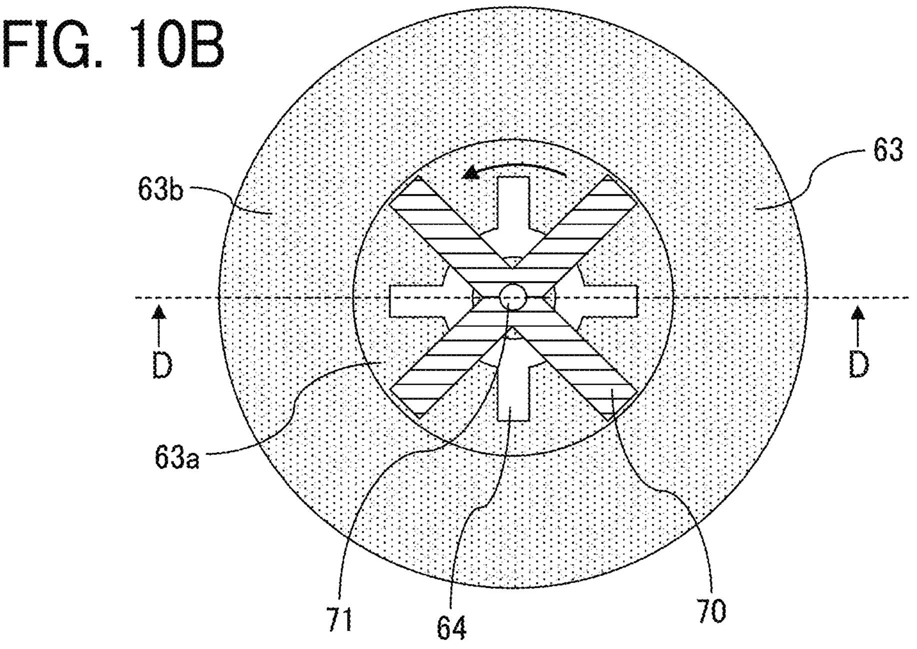
FIG. 10B is a schematic plan view of the part of the liquid storage illustrated in FIG. 9.

As illustrated in FIGS. 9 and 10A, in the present embodiment, a supply needle 71 is used for supplying liquid (e.g., ink) from the ink pack 62. The supply needle 71 is inserted through the opening 64*a* of the stirrer 64 to communicate with the inside of the ink pack 62.

The liquid flows from a hole 71*a* of the supply needle 71 and is supplied through the liquid supply path 68. In the present embodiment, the supply needle 71 serves as the liquid supply port, and the liquid supply port is disposed on the rotation axis of the stirrer 64.

In the present embodiment, a method of rotating the magnet 65 (magnetism generator) can be appropriately determined. As illustrated in FIG. 9, the magnet 65 is supported by a rotation support 72, a gear 73 is disposed on the side face of the rotation support 72, and the gear 73 is rotated by the motor 66. As the gear 73 rotates, the rotation support 72 rotates. As a result, the magnet 65 rotates together with the rotation support 72 to rotate the stirrer 64.

In the present embodiment, as illustrated in FIG. 10A, the plate 63 has an opening which is closed with a rubber 74. When the cartridge 61 having the ink pack 62 is installed in the cartridge holder 60, the supply needle 71 pierces the rubber 74. When the cartridge 61 is installed in the cartridge holder 60, the hole 71*a* of the supply needle 71 communicates with the inside of the ink pack 62, and the liquid is supplied to the liquid discharger via the hole 71*a*.

As described above, the plate 63 has the opening, and the opening is closed with the rubber 74 (an elastic member according to the present embodiment). Accordingly, when ink pack 62 (or the cartridge 61) is not installed in the cartridge holder 60, liquid does not leak from the ink pack 62, and the ink pack 62 can be further easily installed in the cartridge holder 60. Since the stirrer 64 in the ink pack 62 is positioned by the stopper 70, the ink pack 62 can be easily installed in the cartridge holder 60 by piercing the rubber 74 with the supply needle 71.

Although the supply needle 71 is used as the liquid supply port in the above embodiment, a liquid supply port other than the supply needle 71 may be used in other embodiments. For example, a cylindrical component may be used instead of the needle-shaped component, and an opening may be disposed at the tip of the cylindrical component to supply liquid (e.g., ink) through the opening.

Aspects of the present disclosure are, for example, as follows.

Aspect 1

A liquid discharge apparatus includes a liquid discharger, a liquid storage, a stirrer, a plate, and a magnetic force applicator. The liquid discharger discharges a liquid. The liquid storage stores the liquid. The stirrer has a magnetism to rotate to stir the liquid in the liquid storage. The plate is secured to the liquid storage to define a region in which the stirrer rotates. The magnetic force applicator applies a magnetic force to the stirrer from outside the liquid storage to rotate the stirrer.

In other words, a liquid discharge apparatus includes a liquid discharger, a liquid storage, a stirrer, a plate, and a magnetic force applicator. The liquid discharger discharges a liquid. The liquid storage stores the liquid. The stirrer is rotatable in a stirring region in the liquid storage to stir the liquid in the liquid storage. The stirrer has a magnetism. The plate is secured to the liquid storage to define the stirring region. The magnetic force applicator applies a magnetic force to the stirrer from an outside of the liquid storage to rotate the stirrer.

Aspect 2

In the liquid discharge apparatus according to Aspect 1, the plate restricts a movement of the stirrer in a direction of a rotation axis of the stirrer within a predetermined region.

In other words, the plate restricts an axial movement of the stirrer in an axial direction of a rotation axis of the stirrer within a first predetermined range.

Aspect 3

In the liquid discharge apparatus according to Aspect 1 or 2, the plate restricts a movement of the stirrer in a direction perpendicular to a direction of a rotation axis of the stirrer within a predetermined region.

In other words, the plate restricts a radial movement of the stirrer in a radial direction perpendicular to the axial direction within a second predetermined range.

Aspect 4

In the liquid discharge apparatus according to Aspect 2 or 3, the plate includes a restrictor to restrict the movement of the stirrer.

In other words, the plate includes a restrictor to restrict the axial movement and the radial movement of the stirrer.

Aspect 5

In the liquid discharge apparatus according to any one of Aspects 1 to 4, the plate has a liquid supply port at a position shifted from a rotation axis of the stirrer within the region defined by the plate as viewed from above in plan view.

In other words, the plate has a liquid supply port at a position shifted from a rotation axis of the stirrer within the second predetermined range.

Aspect 6

In the liquid discharge apparatus according to any one of Aspects 1 to 4, the plate has a liquid supply port on a rotation axis of the stirrer as viewed from above in plan view.

In other words, the plate has a liquid supply port in the rotation axis of the stirrer in the radial direction.

Aspect 7

The liquid discharge apparatus according to any one of Aspects 1 to 6 further includes a controller, a holder, and a detector. The controller as circuitry controls the magnetic force applicator. The holder holds the liquid storage. The detector detects the liquid storage held in the holder. The liquid storage is detachably attachable to the holder. The magnetic force applicator includes a magnetism generator and a rotation driver. The magnetism generator generates a magnetism to apply the magnetic force to the stirrer. The rotation driver rotates the magnetism generator. The controller drives the rotation driver in response to a detection of the liquid storage in the holder by the detector.

Aspect 8

The liquid discharge apparatus according to Aspect 7 further includes a measuring instrument (time measurer) to measure a time during which the holder holds the liquid storage. The controller drives the rotation driver to rotate the stirrer at a predetermined timing based on a measurement result of the measuring instrument (i.e., the time measured by the time measurer).

Aspect 9

In the liquid discharge apparatus according to any one of Aspects 1 to 8, the liquid storage has a flexibility.

Aspect 10

In the liquid discharge apparatus according to Aspect 9, the liquid storage has multiple folds foldable in an axial direction of a rotation axis of the stirrer, and a volume of the liquid storage decreases with a decrease in an amount of the liquid in the liquid storage.

Aspect 11

In the liquid discharge apparatus according to any one of Aspect 1 to 10, the magnetic force applicator applies the magnetic force to the stirrer via the plate.

Aspect 12

In the liquid discharge apparatus according to any one of Aspect 1 to 11, the stirrer has an opening penetrating through the stirrer as a rotation axis of the stirrer. The plate includes an axial portion and a plate portion. The axial portion is inserted through the opening of the stirrer to restrict a radial movement of the stirrer in a radial direction of the rotation axis of the stirrer. The plate portion is disposed on one end of the axial portion of the plate to restrict an axial movement of the stirrer in an axial direction, perpendicular to the radial direction, of the rotation axis of the stirrer.

As described above, according to one aspect of the present disclosure, the liquid discharge apparatus can be provided that smoothly rotates the stirrer in the liquid storage to prevent the rotating stirrer from contacting the liquid storage. As a result, the liquid can be stirred without damaging the liquid storage.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a liquid discharger to discharge a liquid;

a liquid storage to store the liquid;

a stirrer rotatable in a stirring region in the liquid storage to stir the liquid in the liquid storage, the stirrer having a magnetism;

a plate secured to the liquid storage to define the stirring region;

a magnetic force applicator to apply a magnetic force to the stirrer from an outside of the liquid storage to rotate the stirrer;

circuitry configured to control the magnetic force applicator;

a holder to hold the liquid storage;

a detector to detect the liquid storage held in the holder; and a time measurer to measure a time during which the holder holds the liquid storage, wherein the liquid storage is detachably attachable to the holder, the magnetic force applicator includes:

a magnetism generator to generate a magnetism to apply the magnetic force to the stirrer; and a rotation driver to rotate the magnetism generator, and the circuitry is configured to, drive the rotation driver in response to a detection of the liquid storage in the holder by the detector, and drive the rotation driver to rotate the stirrer at a predetermined timing based on the time measured by the time measurer.

2. The liquid discharge apparatus according to claim 1, wherein the plate restricts an axial movement of the stirrer in an axial direction of a rotation axis of the stirrer within a first predetermined range.

3. The liquid discharge apparatus according to claim 2, wherein the plate restricts a radial movement of the stirrer in a radial direction perpendicular to the axial direction within a second predetermined range.

4. The liquid discharge apparatus according to claim 3, wherein the plate includes a restrictor to restrict the axial movement and the radial movement of the stirrer.

5. The liquid discharge apparatus according to claim 3, wherein the plate has a liquid supply port at a position shifted from the rotation axis of the stirrer within the second predetermined range.

6. The liquid discharge apparatus according to claim 3, wherein the plate has a liquid supply port in the rotation axis of the stirrer in the radial direction.

7. The liquid discharge apparatus according to claim 1, wherein the liquid storage has a flexibility.

8. The liquid discharge apparatus according to claim 7, wherein the liquid storage has multiple folds foldable in an axial direction of a rotation axis of the stirrer, and a volume of the liquid storage decreases with a decrease in an amount of the liquid in the liquid storage.

9. The liquid discharge apparatus according to claim 1, wherein the magnetic force applicator applies the magnetic force to the stirrer via the plate.

10. The liquid discharge apparatus according to claim 1, wherein the stirrer has an opening penetrating through the stirrer as a rotation axis of the stirrer, and the plate includes:

an axial portion inserted through the opening of the stirrer to restrict a radial movement of the stirrer in a radial direction of the rotation axis of the stirrer; and a plate portion on one end of the axial portion of the plate to restrict an axial movement of the stirrer in an axial direction, perpendicular to the radial direction, of the rotation axis of the stirrer.

* * * * *